United States Patent Office 2,965,129
Patented Dec. 20, 1960

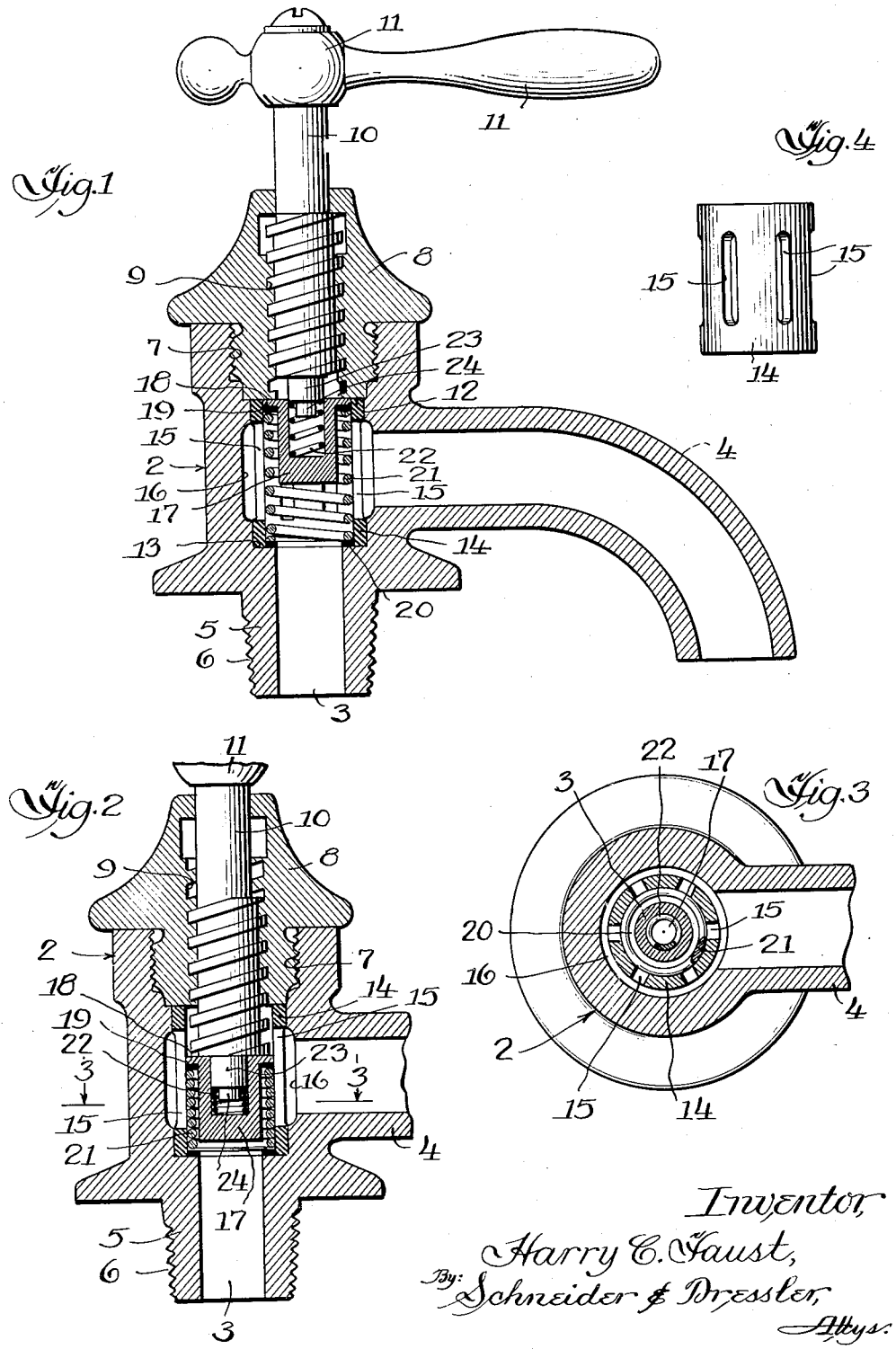

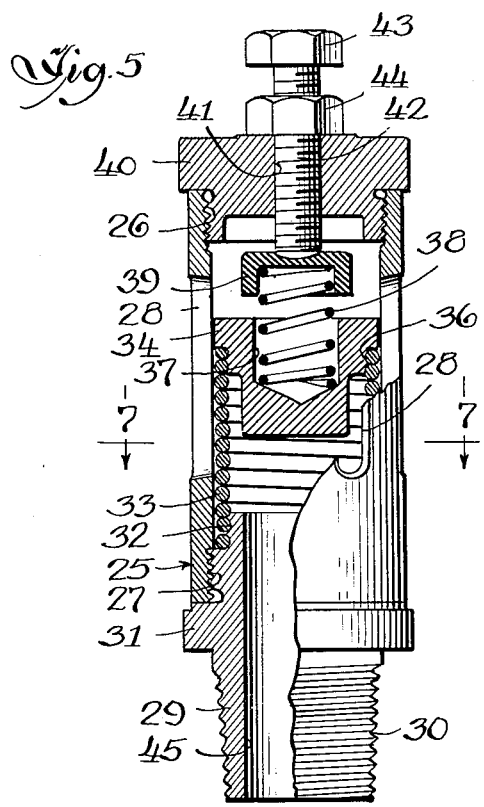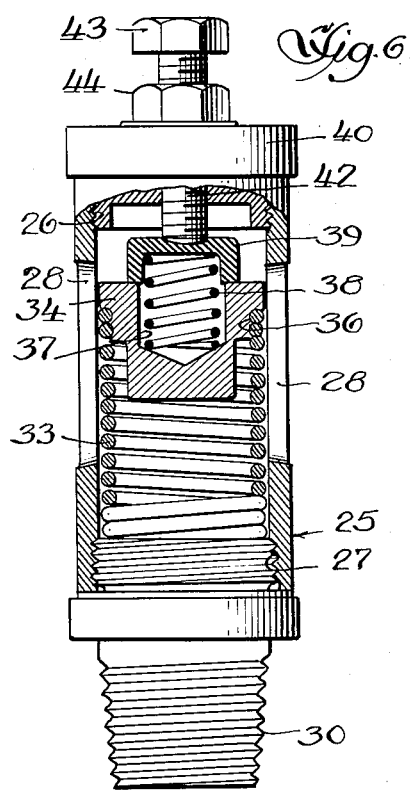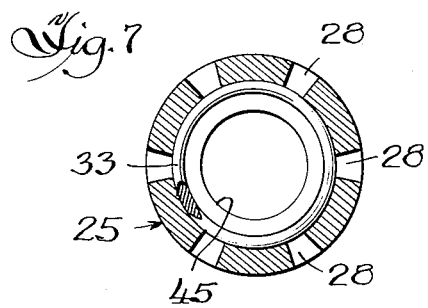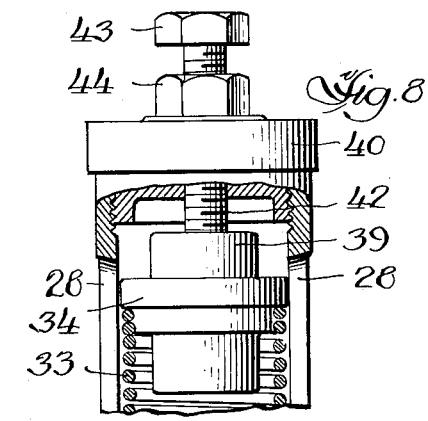

2,965,129

COILED SPRING VALVE

Harry C. Faust, 379 Hawthorn Ave., Glen Ellyn, Ill.

Filed Nov. 21, 1955, Ser. No. 547,971

10 Claims. (Cl. 137—494)

This invention is concerned with a valve comprising a helically coiled spring adapted to form a liquid tight wall when compressed, and an apertured guide sleeve confining the spring to prevent overlapping of the coils.

The apertured sleeve permits water or other fluid to flow through the valve when the spring is expanded, and confines the coils of the spring to insure axial alignment and proper engagement of the abutting surfaces of the coils of the spring to provide a liquid tight seal when the spring is compressed.

In using the valve in a faucet the compressive force of the spring is released by turning the handle, to permit water under pressure to flow between the coils of the spring and through the openings in the sleeve to a conventional outlet. An auxiliary spring stronger than the valve spring, may be included in faucet structure to provide a safety closing feature. In operation of the faucet the valve spring must be completely closed before auxiliary spring is compressed. Accordingly, the user knows that the faucet is completely closed as soon as the auxiliary spring starts compressing movement. When the valve is designed for use as a relief valve an auxiliary compression spring housed in a pair of cup members is provided whereby the pressure required to open the valve may be accurately controlled. The auxiliary spring is stronger than the valve spring, and a screw is applied against one of the cup members to regulate the auxiliary spring to adjust the pressure required for opening the valve to any desired valve.

The structure by which the above mentioned and other advantages of the invention are attained will be described in the following specification, taken in conjunction with the accompanying drawings, showing two preferred illustrative embodiments of the invention, in which:

Fig. 1 is a cross sectional view of a valve embodying the invention as applied to a faucet, the valve being shown in open position;

Fig. 2 is a fragmentary cross sectional view of the structure of Fig. 1, with the valve in closed position;

Fig. 3 is a cross sectional view, taken along the line 3—3 of Fig. 2;

Fig. 4 is a side elevational view of the spring confining guide sleeve;

Fig. 5 is a view, partly in section and partly in elevation, of a relief valve embodying the invention, the valve being shown in closed position;

Fig. 6 is a cross sectional view of the relief valve in open position;

Fig. 7 is a cross sectional view, taken along the line 7—7 of Fig. 5; and

Fig. 8 is a fragmentary view, partly in section and partly in elevation, of the upper portion of the relief valve in open position.

Referring to Figs. 1 to 4 of the drawings, reference numeral 2 indicates a valve body in the form of a casting having a vertical bore 3. A spout 4, preferably integral with the casting, communicates with bore 3 and extends laterally therefrom. A nipple 5 depending from valve body 2 is threaded, as indicated at 6, to permit threaded attachment to a water pipe (not shown). The upper portion of valve body 2 is threaded interiorly, as indicated at 7, to permit securement of a bonnet 8 thereto. Bonnet 8 is provided with a longitudinal interiorly threaded bore 9, and a stem 10 extending through the top of the bonnet is threaded into bore 9. A handle 11 is secured to the upper end of stem 10 to facilitate rotation of the stem.

The bottom of bonnet 8 extends horizontally inwardly of bore 3 to provide an annular shoulder 12. The horizontal plane of shoulder 12 is above the intersection of spout 4 with vertical bore 3. Valve body 2 is provided with another annular shoulder 13 in a horizontal plane below said intersection. The diameter of vertical bore 3 between shoulders 12 and 13 is slightly greater than the diameter of the portion of the vertical bore extending through nipple 5.

A tubular cylindrical guide sleeve 14 is seated on shoulder 13 with its upper edge abutting the bottom of bonnet 8. Sleeve 14 is provided with a plurality of apertures 15 intermediate the length of its cylindrical wall. Although apertures 15 are shown in the form of slots, they may have any desired shape. It is important though, that the total cross sectional area of apertures 15 be substantially equal to or greater than the cross sectional area of the lower portion of vertical bore 3, so that the flow capacity of the apertures is approximately equal to or greater than the flow capacity of the inlet. Valve body 2 is provided with an annular recess 16 enlarging the diameter of bore 3 in the area in which sleeve 14 is positioned. The recess provides a passageway for the water or other fluid flowing through apertures 15 into spout 4. The inside of spout 4 is aligned with recess 16.

A cup 17 having an annular flange 18 extending laterally outwardly at its upper edge is positioned within sleeve 14 with its flange underneath shoulder 12. An annular gasket 19 is positioned adjacent the underside of flange 18, and a similar gasket 20 is positioned on shoulder 13 in vertical alignment with gasket 19. Gaskets 19 and 20 may be of any suitable material but preferably are made of "neoprene." The outer edge of each gasket fits snugly against the inner surface of guide sleeve 14.

A helically coiled compression spring 21 seated on gasket 20 bears against gasket 19 to hold flange 18 against shoulder 12. Another helically coiled compression spring 22 is seated within cup 17. The lower portion of stem 10 is reduced in diameter to form one section 23 having a diameter equal to the inside diameter of cup 17 and a bottom section 24 having a diameter equal to the inside diameter of coil spring 22. Accordingly, section 24 fits within spring 22 and the bottom of section 23 engages the top edge of spring 22 to compress it when handle 11 is rotated sufficiently in the proper direction.

Spring 22 is much stronger than spring 21 so that when handle 11 is rotated to move stem 10 downwardly the first effect is on spring 21. Cup 17 moves downwardly and flange 18 forces spring 21 downwardly to compress it between gaskets 19 and 20. The outer edges of spring 21 are confined by sleeve 14 and the coils are maintained in axial alignment. The top and bottom surfaces of each coil fit tightly against the bottom and top surfaces of the adjacent coils to form a liquid tight wall between gaskets 19 and 20. Spring 21 is preferably a precision spring, and if any foreign matter is caught between the coils the closing action of the spring will pinch it, and the coils will still close completely to form the desired seal.

Downward rotation of stem 10 will not exert any compressive force on spring 22 until the coils of spring 21 are completely closed. Continued downward rotation of stem 10 after spring 21 is sealed will compress spring 22. Accordingly, as soon as spring 22 starts to compress the user will know that spring 21 is sealed and that no water or other liquid can drip from the faucet. This feature facilitates turning off the faucet because handle 11 does not have to be forced tight to close the valve against its seat as in ordinary valves.

Spring 21 acts as the valve, and when the pressure on it is released to allow the coils to separate, water flowing into bore 3 under pressure passes between the coils, and through apertures 15, recess 16, and spout 4. Spring 21 is preferably made of stainless steel to prevent any corrosion. Gaskets 19 and 20 are used merely as cushioning members for opposite ends of spring 21 and are not subjected to any appreciable wear. Since the only operational movement of the valve is the compression and expansion of spring 21, the valve will have an extremely long life.

The relief valve shown in Figs. 5 to 8 comprises a cylindrical valve body 25 threaded interiorly at its opposite ends, as indicated at 26 and 27, and having a plurality of apertures 28 intermediate its threaded ends. Apertures 28 are shown as elongated slots but may be of any desired shape. A nipple 29 threaded into one end of valve body 25 is provided on its lower end with an external thread 30 to adapt it to be secured to a steam or other fluid line (not shown). Nipple 29 has a circumferential flange 31 adapted to abut the bottom edge of valve body 25. The upper portion of nipple 29 is provided with an annular recess 32 to provide a seat for a valve spring 33. In this embodiment spring 33 is a tension spring.

A plug or cup 34 slidably fitting in valve body 25 is recessed, as indicated at 36, to form an abutment for the upper end of spring 33. The uppermost coils of spring 38 are preferably soldered to plug 34 and the lowermost coils are soldered to the upper end of nipple 29 to prevent displacement of the spring from either nipple 29 or plug 34. A recess 37 extends downwardly from the top of plug 34 to provide a seat for a compression spring 38. The upper end of spring 38 is confined in an inverted cup 39.

A cap 40 threaded into engagement with thread 26 closes the upper end of valve body 25. Cap 40 is provided with a vertical bore 41 and a screw 42 threaded through bore 41 engages the upper surface of inverted cup 39. A nut 43 is fixed to the upper end of screw 42 to facilitate rotation of the screw. A lock nut 44 is provided on screw 42 to hold it in any adjusted position.

Spring 38 normally urges plug 34 downwardly to hold spring 33 tightly compressed to provide a fluid tight seal between the upper end of nipple 29 and plug 34. If steam or other fluid in the vertical bore 45 of nipple 29 exerts a pressure on plug 34 strong enough to compress spring 38 it will move the plug upwardly. Since the ends of spring 33 are fixed to nipple 29 and plug 34, the upward movement of plug 34 will stretch the spring and allow steam or other fluid to pass between the coils of the spring and outward through apertures 28. When sufficient steam or other fluid has escaped through apertures 28 to reduce the pressure against plug 34, spring 38 will force plug 34 downwardly to seal the coils of spring 33 against further escape of steam or fluid. The amount of pressure required to move plug 34 upwardly to separate the coils of spring 33 is controlled by the rotation of screw 42.

In both embodiments the coils of a spring are held closed to form a solid wall adapted to prevent passage of fluid through the valve body, and the spring is either stretched or allowed to stretch by its own spring action to permit fluid to pass through the spaces between adjacent spring coils when the valve is in open position.

Although I have described two preferred embodiments of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. A valve comprising a helically coiled spring, a tubular sleeve engaging the outer peripheral surface of said spring throughout the length of said spring to maintain the coils of the spring in axial alignment and to prevent lateral slippage of any portion of said spring, and a cup slidably mounted in said sleeve, said cup abutting one end of said spring, means to press said cup toward the opposite end of said sleeve to maintain said spring compressed against the flow of fluid therethrough, said sleeve having a plurality of apertures spaced circumferentially thereof to permit flow of fluid from the interior of said valve through said apertures when said spring is in extended condition.

2. A valve comprising a helically coiled spring, a tubular sleeve engaging the outer peripheral surface of said spring throughout the length of said spring to maintain the coils of the spring in axial alignment, said sleeve having a fluid inlet in vertical alignment with the interior of said valve, said sleeve being provided with a plurality of apertures having a total cross sectional area approximately equal to the cross sectional area of said fluid inlet to permit free flow of fluid from the interior of said valve through said apertures when said spring is in extended condition, and a plug slidably mounted in said sleeve, said plug being engageable with the end of said spring most remote from said inlet to provide a seal for said end when said spring is compressed.

3. A faucet comprising a valve body having a vertical bore for the flow of fluid therethrough, an annular recess extending along a portion of the interior surface of said vertical bore, a tubular spout extending laterally from said valve body and communicating with said annular recess, a tubular guide sleeve seated in said valve body, said guide sleeve having a plurality of apertures spaced circumferentially thereof and communicating with said annular recess, and a helically coiled spring positioned within said sleeve, said spring when in uncompressed position allowing the flow of fluid from the interior of said valve body through the coils of said spring and through said apertures, the inner surface of said sleeve engaging the outer peripheral surface of said spring throughout the length of said spring to prevent lateral slippage of any portion of said spring and to confine it against lateral movement relative to said valve body, said spring when in compressed position preventing the flow of fluid through said coils.

4. A faucet comprising a valve body having a vertical bore for the flow of fluid therethrough, an annular recess extending along a portion of the interior surface of said vertical bore, a tubular spout extending laterally from said valve body and communicating with said annular recess, a tubular guide sleeve seated in said valve body, said guide sleeve having a plurality of apertures spaced circumferentially thereof and communicating with said annular recess, said apertures having a total cross sectional area at least equal to the cross sectional area of said vertical bore, and a helically coiled spring positioned within said sleeve, said spring when in uncompressed position allowing the flow of fluid from the interior of said valve body through the coils of said spring and through said apertures, the inner surface of said sleeve engaging the outer peripheral surface of said spring throughout the length of said spring to prevent lateral slippage of any portion of said spring and to confine it against lateral movement relative to said valve body, said spring when in compressed position preventing the flow of fluid through said coils.

5. A faucet comprising a valve body having a vertical bore, an annular recess extending along a portion of the interior surface of said vertical bore, a tubular spout extending laterally from said valve body and communicating with said annular recess, a tubular guide sleeve seated in said valve body, said guide sleeve having a plurality of apertures spaced circumferentially thereof and communicating with said annular recess, said apertures having a total cross sectional area at least equal to the cross sectional area of said vertical bore, and a helically coiled compression spring positioned within said sleeve, the inner surface of said sleeve engaging the outer peripheral surface of said spring throughout the length of said spring to prevent lateral slippage of any portion of said spring, the top and bottom surfaces of each coil of said spring being adapted to engage the bottom and top surfaces of adjacent coils when said spring is compressed to form a fluid tight wall, said spring being expansible to permit fluid under pressure in said vertical bore to flow from the interior of said valve body between said coils and through said apertures and said recess into said spout.

6. A faucet comprising a valve body having a vertical bore, an annular recess extending along a portion of the interior surface of said vertical bore, a tubular spout extending laterally from said valve body and communicating with said annular recess, a tubular guide sleeve seated in said valve body and having a fluid inlet in vertical alignment with said vertical bore, said guide sleeve having a plurality of apertures communicating with said annular recess, said apertures having a total cross sectional area at least equal to the cross sectional area of said vertical bore, a helically coiled compression spring positioned within said sleeve, the inner surface of said sleeve engaging the outer peripheral surface of said spring throughout the length of said spring to maintain the coils of said spring in axial alignment and to confine it against lateral movement relative to said valve body, the top and bottom surfaces of each coil of said spring being adapted to engage the bottom and top surfaces of adjacent coils when said spring is compressed to form a fluid tight wall, said spring being expansible to permit fluid under pressure in said vertical bore to flow from the interior of said vertical bore between said coils and through said apertures and said recess into said spout, and a plug slidably mounted in said sleeve, said plug being engageable with the end of said spring most remote from said inlet to provide a seal for said end when said spring is compressed.

7. A valve comprising a helically coiled spring, a tubular sleeve engaging the outer peripheral surface of said spring throughout the length of said spring to maintain the coils of said spring in axial alignment, said sleeve having a plurality of apertures to permit flow of fluid from the interior of said valve between the coils of said spring and through said apertures when said spring is in extended position, a cup slidably mounted in said sleeve, said cup having an annular flange bearing against the upper end of said spring, a second spring seated in said cup, and threaded means bearing against said second spring, said threaded means being rotatable to exert pressure against said second spring to urge said cup downwardly to move said first mentioned spring into compressed position with each coil of said first mentioned spring engaging the adjacent coils to form a fluid tight wall.

8. A valve comprising a tubular sleeve and a helically coiled spring positioned within said sleeve, said sleeve engaging the outer peripheral surface of said spring throughout the length of said spring to maintain the coils of the spring in axial alignment, means urging said spring into compressed position with each coil engaging each adjacent coil to form a fluid tight wall, said means being responsive to pressure interiorly of said valve to permit expansion of said spring to permit flow of fluid under pressure between the coils of said spring, said sleeve having a plurality of apertures intermediate its length to permit flow of said fluid under pressure outwardly through the wall of said tubular sleeve.

9. A valve comprising a tubular sleeve, a nipple threaded into one end of said sleeve, said nipple having a vertical bore, a helically coiled spring positioned within said sleeve with its lower end engaging said nipple, the inner surface of said sleeve engaging the outer peripheral surface of said spring throughout the length of said spring to confine it against lateral movement relative to said sleeve, and means adapted to hold said spring in compressed position with each coil engaging the adjacent coils to form a fluid tight wall, said means being responsive to the pressure of fluid in said vertical bore to permit expansion of said spring to permit flow of fluid under pressure between the coils of said spring, said sleeve having a plurality of apertures intermediate its length to permit flow of said fluid under pressure outwardly through the wall of said tubular sleeve.

10. A valve comprising a tubular sleeve, a nipple threaded into one end of said sleeve, said nipple having a vertical bore, a helically coiled spring positioned within said sleeve with its lower end engaging said nipple, the inner surface of said sleeve engaging the outer peripheral surface of said spring throughout the length of said spring to confine it against lateral movement relative to said sleeve, a flanged member engaging the upper end of said spring, a second spring engaging the opposite surface of said flanged member, and a screw rotatable to exert compressive force against said second spring to urge said flanged member downwardly and thereby compress said first mentioned spring, the coils of said first mentioned spring engaging each other in compressed position to form a fluid tight wall, said flanged member being responsive to the pressure of fluid in said vertical bore to permit expansion of said first mentioned spring to permit flow of fluid under pressure between its coils, said sleeve having a plurality of apertures extending through its wall to permit escape of said fluid when said first mentioned spring is expanded.

References Cited in the file of this patent

UNITED STATES PATENTS

| | | |
|---|---|---|
| 600,360 | Crane | Mar. 8, 1898 |
| 1,222,066 | Brown | Apr. 10, 1917 |
| 1,879,020 | Balsiger | Sept. 27, 1932 |
| 2,363,279 | Anschicks | Nov. 21, 1944 |
| 2,369,005 | Anschicks | Feb. 6, 1945 |
| 2,451,387 | Harvuot | Oct. 12, 1948 |

FOREIGN PATENTS

| | | |
|---|---|---|
| 8,571 | Great Britain | of 1901 |
| 2,600 | Great Britain | of 1915 |

UNITED STATES PATENT OFFICE
CERTIFICATION OF CORRECTION

Patent No. 2,965,129 December 20, 1960

Harry C. Faust

It is hereby certified that error appears in the above numbered patent requiring correction and that the said Letters Patent should read as corrected below.

Column 1, line 43, for "valve", second occurrence, read -- value --; column 3, line 36, for "38" read -- 33 --; line 47, for "nut" read -- head --.

Signed and sealed this 6th day of June 1961.

(SEAL)
Attest:

ERNEST W. SWIDER
Attesting Officer

DAVID L. LADD
Commissioner of Patents